US011325856B2

(12) United States Patent
Li et al.

(10) Patent No.: US 11,325,856 B2
(45) Date of Patent: May 10, 2022

(54) ALUMINOBOROSILICATE GLASS AND PREPARATION METHOD AND APPLICATION THEREOF

(71) Applicants: TUNGHSU TECHNOLOGY GROUP CO., LTD., Beijing (CN); TUNGHSU GROUP CO., LTD., Shijiazhuang (CN)

(72) Inventors: Qing Li, Shijiazhuang (CN); Guangtao Zhang, Shijiazhuang (CN); Junfeng Wang, Shijiazhuang (CN); Xingjun Xu, Shijiazhuang (CN); Dongcheng Yan, Shijiazhuang (CN); Lihong Wang, Shijiazhuang (CN); Quan Zheng, Shijiazhuang (CN)

(73) Assignees: TUNGHSU TECHNOLOGY GROUP CO., LTD., Beijing (CN); TUNGHSU GROUP CO., LTD., Hebei (CN)

( * ) Notice: Subject to any disclaimer, the term of this patent is extended or adjusted under 35 U.S.C. 154(b) by 281 days.

(21) Appl. No.: 16/627,032

(22) PCT Filed: Apr. 16, 2018

(86) PCT No.: PCT/CN2018/083220
§ 371 (c)(1),
(2) Date: Dec. 27, 2019

(87) PCT Pub. No.: WO2019/001093
PCT Pub. Date: Jan. 3, 2019

(65) Prior Publication Data

US 2020/0115272 A1 Apr. 16, 2020

(30) Foreign Application Priority Data

Jun. 30, 2017 (CN) ......................... 201710527909.6

(51) Int. Cl.
*C03C 3/091* (2006.01)
*C03C 3/093* (2006.01)
*C03C 3/095* (2006.01)
*C03C 3/066* (2006.01)

(52) U.S. Cl.
CPC .............. *C03C 3/093* (2013.01); *C03C 3/066* (2013.01); *C03C 2203/10* (2013.01)

(58) Field of Classification Search
CPC ......... C03C 3/064; C03C 3/066; C03C 3/068; C03C 3/091; C03C 3/093; C03C 3/095
See application file for complete search history.

(56) References Cited

U.S. PATENT DOCUMENTS 4,166,745 A 9/1979 Araujo et al.
5,262,363 A 11/1993 Yoshida et al.
6,096,670 A 8/2000 Lautenschlager et al.
6,716,779 B2 4/2004 Lin
6,825,141 B2 11/2004 Sato
8,445,394 B2 * 5/2013 Aitken .................... C03C 3/087 501/66
9,952,378 B2 * 4/2018 Lautenschlager ..... C03C 4/0092
2002/0151426 A1 * 10/2002 Murata ................... C03C 3/093 501/66
2003/0050173 A1 3/2003 Lin
2003/0109370 A1 6/2003 Ikenishi et al.
2003/0127959 A1 7/2003 Nishikawa et al.
2005/0181927 A1 8/2005 Hasegawa et al.
2007/0042894 A1 2/2007 Aiken et al.
2010/0292066 A1 11/2010 Zou et al.
2014/0284577 A1 9/2014 Mennemann et al.
2015/0018194 A1 1/2015 Li et al.
2015/0259242 A1 9/2015 Tezuka
2019/0161387 A1 * 5/2019 Nomura ................ G02F 1/1333

FOREIGN PATENT DOCUMENTS

| | | | |
|---|---|---|---|
| CN | 1450010 | A | 10/2003 |
| CN | 1460091 | A | 12/2003 |
| CN | 1590330 | A | 3/2005 |
| CN | 1286753 | C | 11/2006 |
| CN | 105392744 | A | 3/2016 |
| CN | 105859124 | A | 8/2016 |
| CN | 106830675 | A | 6/2017 |
| CN | 107298528 | A | 10/2017 |
| DE | 19601922 | A1 | 7/1997 |
| DE | 19739912 | C1 | 12/1998 |
| DE | 102013102848 | B3 | 2/2014 |
| EP | 1 512 671 | A1 | 3/2005 |
| EP | 1653499 | A1 | 5/2006 |
| JP | H03215328 | A | 9/1991 |
| JP | 2002358626 | A | 12/2002 |
| JP | 2003007421 | A | 1/2003 |
| JP | 2005093422 | A | 4/2005 |
| JP | 2007269544 | A | 10/2007 |
| JP | 2009504563 | A | 2/2009 |
| JP | 2013121905 | A | 6/2013 |
| JP | 2015174791 | A | 10/2015 |
| JP | 2016132601 | A | 7/2016 |
| WO | 2016183133 | A1 | 11/2016 |

* cited by examiner

*Primary Examiner* — Karl E Group
(74) *Attorney, Agent, or Firm* — Volpe Koenig

(57) ABSTRACT

The present invention relates to the field of glass manufacturing, and discloses aluminoborosilicate glass, and a preparation method and an application thereof. Based on the total weight of components in the composition of the glass, the glass comprises: 33-60 wt % $SiO_2$, 3-10 wt % $Al_2O_3$, 10-30 wt % $B_2O_3$, 1-15 wt % $ZnO+TiO_2+Sc_2O_3$, and 7-27 wt % alkaline-earth oxide RO, wherein RO is at least one of MgO, CaO, SrO and BaO, and 0.001 wt $\% \leq Sc_2O_3 \leq 1$ wt%. The aluminoborosilicate glass provided in the present invention has advantages including low density, high index of refraction, low thermal expansion coefficient, high thermostability, high flexibility, and easy bending, etc.

19 Claims, No Drawings

ALUMINOBOROSILICATE GLASS AND PREPARATION METHOD AND APPLICATION THEREOF

CROSS REFERENCE TO RELATED APPLICATIONS

This application is a 35 USC § 371 national stage of PCT/CN2018/083220, which was filed Apr. 16, 2018, is entitled "ALUMINOBOROSILICATE GLASS AND PREPARATION METHOD AND APPLICATION THEREOF," and claims priority to Chinese Application No. 201710527909.6, filed on Jun. 30, 2017, both of which are incorporated herein by reference as if fully set forth.

FIELD

The present invention relates to the field of glass manufacturing, in particular to aluminoborosilicate glass, and a preparation method and an application thereof.

BACKGROUND

As smartphones and tablet PCs are popularized, an era of intelligent mobility has come. In the past, mobile phones were limited to communication functions. However, presently, the performance of intelligent devices, including smart phones and tablet PCs, is close to that of notebook computers, which enables people to carry out and enjoy high-level business and entertainment activities at any time by virtue of the convenience of wireless communication. In such a trend, the requirements for display performance are also increasing, especially for image quality and outdoor visual performance of mobile intelligent devices. At the same time, in order to reduce the burden during the use of hand-held devices, lighter weight and thinner profile become an inevitable trend. Under the guidance of that trend, display panels are developed towards low density, light weight and super-high definition display, and panel manufacturing processes are developed towards higher processing temperature; at the same time, the thickness of a single piece of glass treated through the manufacturing process can be 0.25 mm, 0.2 mm, 0.1 mm, or even smaller. However, as the thickness of the glass substrate is decreased greatly, the mechanical strength of the display panel after the cell process is severely decreased, the dropping and impact resistance property is severely challenged, and failures in the bending test often occur in the panel manufacturing process. Therefore, it is one of the important subjects to improve the flexibility of the substrate glass material and decrease the brittleness of the glass material in the material research process.

In the flexible display field, a flexible display device is mainly composed of three layers, i.e., a substrate, an intermediate display medium, and a packaging layer. The substrate material may be prepared from glass, organic polymers, or metal materials, etc., which have their merits and demerits respectively, and there is no solution that incorporates strength and flexibility perfectly at present. Organic polymer flexible substrate materials have advantages including low cost and easy manufacturing, etc., but have severe limitations in terms of thermostability and water vapor and oxygen barrier property, etc. For example, optimized polyimide (abbreviated as PI) can ensure high temperature up to 400° C., but still can't meet the requirements of 600° C. high-temperature LTPS manufacturing process. On the other hand, to meet the requirement for water vapor and oxygen barrier property of the OLED material, a high-cost film package process has to be used. Compared with flexible materials, such as polymer or metal foil materials, ultra-thin glass in thickness <0.1 mm is a glass material in a highly optimized formulation, has outstanding water vapor and oxygen barrier performance, excellent chemical resistance and mechanical properties, and lower thermal expansion and higher thermostability. Its greatest advantage lies in maturity and compatibility of coating technology. Presently, all mainstream AMLCDs and AMOLEDs are TFTs produced on glass substrates, and relevant techniques, equipment and industrial chains are highly matured, the compatibility is very ideal, and the production cost will surely be greatly reduced. Though flexible glass substrates can't be folded, not all application scenarios require foldable devices. There are high application demands for non-foldable flexible photoelectric devices, such as high-definition photoelectric display devices with a fixed curved surface, etc. On one hand, flexible glass substrates with high heat resistance performance are helpful for successful implementation of LTPS techniques and the like, and can meet the requirements of preparation of high-definition flexible display devices. The glass material used as flexible glass substrates shall have sufficient high thermostability. For example, the strain point may be higher than 640° C., 660° C., or even 680° C. On the other hand, for ultra-thin glass that is made of a brittle material, in the material aspect, it is still a big challenge to decrease the brittleness and further improve the advantages. For example, the flexibility and bending properties of ultra-thin glass may be increased by improving the components. Besides, increasing the refractive index of the glass substrates properly without severely increasing the manufacturing to cost is beneficial for the light extraction efficiency and overall display effect of OLED lighting or display devices.

SUMMARY

To solve the above problems existing in the prior art, the present invention provides aluminoborosilicate glass, and a preparation method and an application thereof. The aluminoborosilicate glass provided in the present invention has advantages including low density, high refractive index, low thermal expansion coefficient, high thermal stability, high flexibility, and easy bending, etc.

To attain the above objects, in a first aspect, the present invention provides aluminoborosilicate glass, based on the total weight of components in the composition of the glass, comprising: 33-60 wt % $SiO_2$, 3-10 wt % $Al_2O_3$, 10-30 wt % $B_2O_3$, 1-15 wt % $ZnO+TiO_2+Sc_2O_3$, and 7-27 wt % alkaline-earth oxide RO, wherein RO is at least one of MgO, CaO, SrO and BaO, and 0.001 wt %$\leq Sc_2O_3 \leq$1 wt %.

Preferably, based on the total weight of components in the composition of the glass, the contents of the components of the glass measured in weight percentage meet: (MgO+BaO)/(MgO+CaO+SrO+BaO)>0.6.

Preferably, based on the total weight of components in the composition of the glass, the contents of the components of the glass measured in weight percentage meet: $ZnO/(ZnO+TiO_2+Sc_2O_3)>0.6$.

Preferably, based on the total weight of components in the composition of the glass, the contents of the components of the glass measured in weight percentage meet: 0.1 wt %$\leq Sc_2O_3 \leq$0.7 wt %.

Preferably, based on the total weight of components in the composition of the glass, the contents of the components of the glass measured in weight percentage meet: 40 wt %$\leq SiO_2+Al_2O_3 \leq$65 wt %.

Preferably, based on the total weight of components in the composition of the glass, the contents of the components of the glass measured in weight percentage meet: the brittleness coefficient D is 0-1, further preferably is 0.2-0.8, and still further preferably is 0.3-0.6, wherein the value D is calculated with the following formula:

$$D=P_1*SiO_2+2.0*B_2O_3-2.0*(Al_2O_3+CaO)+0.5*SrO+1.0*(MgO+BaO+ZnO+TiO_2+Sc_2O_3)-4*\Sigma Q$$

Wherein $SiO_2$, $B_2O_3$, $Al_2O_3$, MgO, CaO, SrO, BaO, ZnO, $TiO_2$, and $Sc_2O_3$ respectively represent the weight percentages of the components in the total weight, $\Sigma Q$ represents the sum of other components except $SiO_2$, $B_2O_3$, $Al_2O_3$, MgO, CaO, SrO, BaO, ZnO, $TiO_2$, and $Sc_2O_3$, and $P_1$ is 0.2 if 33 wt %≤$SiO_2$≤54 wt %, or is −0.5 if 54 wt %<$SiO_2$≤60 wt %.

Preferably, the density of the aluminoborosilicate glass is lower than 3 $g/cm^3$, further preferably is 2.43-2.68 $g/cm^3$; the refractive index $n_D$ is greater than 1.52, further preferably $1.52<n_D<1.55$; the thermal expansion coefficient within 50-350° C. range is lower than $45\times10^{-7}$/° C., further preferably is $29\times10^{-7}$/° C.–$41\times10^{-7}$/° C.

Preferably, the bending coefficient $C_R$ of aluminoborosilicate glass in thickness ≤0.5 mm meets: $0<C_R<0.5$, further preferably $0<C_R<0.45$, still further preferably $0<C_R<0.4$, wherein the $C_R$ value is calculated with the following formula:

$$C_R=(R*\sigma)/(E*d)$$

Wherein E is the Young's modulus of the aluminoborosilicate glass, in unit of MPa; d is the thickness of the aluminoborosilicate glass, in unit of mm; R is the minimum curvature radius of the aluminoborosilicate glass when the aluminoborosilicate glass is bent, in unit of mm; σ is the bending stress in the aluminoborosilicate glass in curvature radius R, in unit of MPa.

Preferably, the strain point temperature of the aluminoborosilicate glass is higher than 680° C.

Preferably, the difference between the forming temperature $T_4$ and the liquidus temperature $T_1$ of the aluminoborosilicate glass is greater than 100° C.

Preferably, the Young's modulus of the aluminoborosilicate glass is smaller than 80 GPa.

In a second aspect, the present invention provides a method for preparing aluminoborosilicate glass, comprising: providing a raw material composition according to the composition of the aluminoborosilicate glass in the present invention, and treating the raw material composition by melting, forming, annealing, and machining sequentially.

Preferably, the method further comprises treating the product obtained after the machining by secondary melting and thinning.

Further preferably, the conditions of the machining process or the secondary melting and thinning process are controlled to prepare glass in thickness smaller than 0.1 mm.

In a third aspect, the present invention provides aluminoborosilicate glass prepared with the method described above.

In a fourth aspect, the present invention provides an application of the aluminoborosilicate glass provided in the present invention in preparation of display device and/or solar cell, preferably an application in preparation of a glass substrate material and/or a glass film material for screen surface protection of flat panel display products, a glass substrate material and/or a glass material for surface packaging and/or a glass film material for screen surface protection of flexible display products, or a glass substrate material of flexible solar cell, and application in other application fields where a glass material that has higher thermostability and high flexibility and is easy to bend is required.

The glass material in the present invention is a glass material with excellent flexibility, belongs to an aluminoborosilicate glass system, and is applicable to production of plate glass in thickness >0.1 mm or flexible glass in thickness <0.1 mm (i.e., flexible glass in thickness <0.1 mm obtained through an one-step forming process) with a variety of existing methods, such as float method, overflow method, and down-drawing method, etc., or production of flexible glass in thickness <0.1 mm with a secondary melting and thinning method. The glass provided in the present invention has high strain point, low density, high refractive index, low thermal expansion coefficient, high thermostability, high flexibility, and is easy to bend and suitable for large-scale industrial production.

Other features and advantages of the present invention will be further detailed in the embodiments hereunder.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

In a first aspect, the present invention provides aluminoborosilicate glass, based on the total weight of components in the composition of the glass, compriseing: 33-60 wt % $SiO_2$, 3-10 wt % $Al_2O_3$, 10-30 wt % $B_2O_3$, 1-15 wt % $ZnO+TiO_2+Sc_2O_3$, and 7-27 wt % alkaline-earth oxide RO, wherein RO is at least one of MgO, CaO, SrO and BaO, and 0.001 wt %≤$Sc_2O_3$≤1 wt %.

Preferably, based on the total weight of components in the composition of the glass, the contents of the components of the glass measured in weight percentage meet: (MgO+BaO)/(MgO+CaO+SrO+BaO)>0.6.

Preferably, based on the total weight of components in the composition of the glass, the contents of the components of the glass measured in weight percentage meet: $ZnO/(ZnO+TiO_2+Sc_2O_3)>0.6$.

Preferably, based on the total weight of components in the composition of the glass, the contents of the components of the glass measured in weight percentage meet: 0.1 wt %≤$Sc_2O_3$≤0.7 wt %.

Preferably, based on the total weight of components in the composition of the glass, the contents of the components of the glass measured in weight percentage meet: 40 wt %≤$SiO_2+Al_2O_3$≤65 wt %.

Preferably, based on the total weight of components in the composition of the glass, the contents of the components of the glass measured in weight percentage meet: the brittleness coefficient D is 0-1, further preferably is 0.2-0.8, and still further preferably is 0.3-0.6, wherein the value D is calculated with the following formula:

$$D=P_1*SiO_2+2.0*B_2O_3-2.0*(Al_2O_3+CaO)+0.5*SrO+1.0*(MgO+BaO+ZnO+TiO_2+Sc_2O_3)-4*\Sigma Q$$

Wherein $SiO_2$, $B_2O_3$, $Al_2O_3$, MgO, CaO, SrO, BaO, ZnO, $TiO_2$, and $Sc_2O_3$ respectively represent the weight percentages of the components in the total weight, $\Sigma Q$ represents the sum of other components except $SiO_2$, $B_2O_3$, $Al_2O_3$, MgO, CaO, SrO, BaO, ZnO, $TiO_2$, and $Sc_2O_3$, and $P_1$ is 0.2 if 33 wt %≤$SiO_2$≤54 wt %, or is −0.5 if 54 wt %<$SiO_2$≤60 wt %.

Preferably, the density of the aluminoborosilicate glass is lower than 3 g/cm$^3$, further preferably is 2.43-2.68 g/cm$^3$;

Preferably, the refractive index $n_D$ of the aluminoborosilicate glass is greater than 1.52, further preferably $1.52<n_D<1.55$.

Preferably, the thermal expansion coefficient of the aluminoborosilicate glass within 50-350° C. range is lower than $45\times10^{-7}$/° C., further preferably is $29\times10^{-7}$/° C.−$41\times10^{-7}$/° C.

Preferably, the bending coefficient $C_R$ of aluminoborosilicate glass in thickness ≤0.5 mm meets: $0<C_R<0.5$, further preferably $0<C_R<0.45$, still further preferably $0<C_R<0.4$, wherein the $C_R$ value is calculated with the following formula:

$$C_R=(R*\sigma)/(E*d)$$

Wherein E is the Young's modulus of the aluminoborosilicate glass, in unit of MPa; d is the thickness of the aluminoborosilicate glass, in unit of mm; R is the minimum curvature radius of the aluminoborosilicate glass when the aluminoborosilicate glass is bent, in unit of mm; σ is the bending stress in the aluminoborosilicate glass in curvature radius R, in unit of MPa. Wherein the lower the $C_R$ value is, the higher the flexibility of the glass is, and the higher the bendability of the glass is.

Preferably, the strain point temperature of the aluminoborosilicate glass provided in the present invention is higher than 680° C.

Preferably, the difference between the forming temperature $T_4$ and the liquidus temperature $T_1$ of the aluminoborosilicate glass provided in the present invention is greater than 100° C. Wherein $T_4$ is the forming temperature corresponding to 40,000 P viscosity value.

Preferably, the Young's modulus of the aluminoborosilicate glass provided in the present invention is smaller than 80 GPa.

Preferably, the transmittance of the aluminoborosilicate glass provided in the present invention is 91% or above.

In a second aspect, the present invention provides a method for preparing aluminoborosilicate glass, comprising: providing a raw material composition according to composition of the aluminoborosilicate glass in the present invention, and treating the raw material composition by melting, forming, annealing, and machining sequentially.

Wherein specifically the present invention further provides a raw material composition, based on the total weight of the composition, on an oxide basis, comprising 33-60 wt % $SiO_2$, 3-10 wt % $Al_2O_3$, 10-30 wt % $B_2O_3$, 1-15 wt % $ZnO+TiO_2+Sc_2O_3$, and 7-27 wt % alkaline-earth oxide RO, wherein RO is at least one of MgO, CaO, SrO, and BaO, and 0.001 wt %≤$Sc_2O_3$≤1 wt %.

In the raw material composition in the present invention, $SiO_2$ is a base material for forming a network structure, can improve the heat resistance and chemical durability of the glass, makes the glass resistant to devitrification, and is beneficial for the vitrification process. However, excessive $SiO_2$ may cause increased melting temperature and increased brittleness, is adverse to improvement of the refractive index $n_D$, and introduces extremely high requirements for the production process. The inventor of the present invention has further found in the research: when the content of $SiO_2$ is ≥33 wt % measured in mass percentage, the mechanical properties and chemical resistance of the obtained glass can be further improved; however, the flexibility of the glass will be degraded if the content is too high. Therefore, in order to further improve the overall properties and flexibility of the obtained glass, preferably, based on the total weight of the composition and measured in oxide in weight percentage, the content of $SiO_2$ should be: 33 wt %≤$SiO_2$≤60 wt %. Further preferably, measured in mass percentage, 33 wt %≤$SiO_2$≤54 wt %.

In the raw material composition in the present invention, as a base material for aluminoborosilicate glass, $B_2O_3$ can form glass separately and can improve the flexibility of the glass; besides, $B_2O_3$ is an ideal solubilizer, can greatly decrease the melting temperature of the glass, and is beneficial for the vitrification process as well; however, excessively high $B_2O_3$ content is adverse to the improvement of thermostability and refractive index $n_D$. Therefore, with comprehensive consideration, based on the total weight of the composition and measured in oxide in weight percentage, the content of $B_2O_3$ should be: 10 wt %≤$B_2O_3$≤30 wt %.

In the raw material composition in the present invention, $Al_2O_3$ can promote the integrity of network connections and greatly improve the heat resistance of the glass, but make the structure of the glass tend to be rigid and increase the brittleness of the glass, and may result in devitrification of the glass and excessive high-temperature surface tension and high-temperature viscosity, inhibit the improvement of the refractive index $n_D$ and increase the difficulties in the glass production process, etc. Therefore, with comprehensive consideration, based on the total weight of the composition and measured in oxide, the content of $Al_2O_3$ is within 3-10 wt % range.

In the raw material composition in the present invention, preferably, based on the total weight of the composition, on an oxide basis, 40 wt %≤$SiO_2+Al_2O_3$≤65 wt %.

In the raw material composition in the present invention, MgO, CaO, SrO, and BaO belong to alkaline-earth oxides, can effectively decrease the high-temperature viscosity of the glass and thereby improve the melting and forming performance of the glass, and improve the strain point and refractive index $n_D$ of the glass as well; besides, MgO and BaO can decrease the brittleness of the glass. However, if the content of these alkaline-earth oxides is excessive, the density will be increased, the occurrence rates of cracks, devitrification, and phase separation will be increased; besides, excessive CaO is adverse to the improvement of the flexibility of the glass. Therefore, with comprehensive consideration, based on the total weight of the composition and the weight of each component, on an oxide basis, the glass contains 7-27 wt % alkaline-earth oxides RO, wherein RO is one or more of MgO, CaO, SrO and BaO. Preferably, based on the total weight of the composition, on an oxide basis, (MgO+BaO)/(MgO+CaO+SrO+BaO)>0.6.

In the raw material composition in the present invention, ZnO, $TiO_2$, and $Sc_2O_3$ can effectively decrease the high-temperature viscosity and upper limit of devitrification temperature of the glass, and attain effects of improving strength, hardness, chemical resistance and flexibility of the glass and remarkably increasing the refractive index $n_D$ of the glass at temperatures lower the softening point of the glass. However, excessive ZnO, $TiO_2$ and $Sc_2O_3$ are adverse to the improvement of the stability of glass formation. Therefore, with comprehensive consideration, based on the total weight of the composition, on an oxide basis, the content of $ZnO+TiO_2+Sc_2O_3$ is within 1-15 wt % range, preferably $ZnO/(ZnO+TiO_2+Sc_2O_3)>0.6$. Wherein $Sc_2O_3$ can remarkably improve the heat resistance and refractive index $n_D$, and can improve the bending performance of the glass in the case that the glass is made into ultra-thin glass; however, excessive $Sc_2O_3$ is adverse to the stability of glass formation. Therefore, with comprehensive consideration, 0.001 wt %≤$Sc_2O_3$≤1 wt %, preferably 0.1 wt %≤$Sc_2O_3$≤0.7 wt %.

In the raw material composition in the present invention, depending on the specific glass preparation process, the composition may further contain a clarifier during glass melting, wherein the clarifier preferably is at least one of sulfate, nitrate, halide, tin oxide, and stannous oxide; based on the total weight of the components, on an oxide basis, the content of the clarifier is not higher than 1 wt %. There is no particular restriction on the specific selection of the clarifier. In other words, the clarifier may be any common clarifier in the art. For example, the sulfate may be barium sulfate, the nitrate may be barium nitrate, and the halide may be barium chloride and/or calcium fluoride.

Those skilled in the art should understand that the expression "the raw material composition in the present invention contains $SiO_2$, $B_2O_3$, $Al_2O_3$, ZnO, $TiO_2$, $Sc_2O_3$, MgO, CaO, SrO, and BaO" means that the composition contains Si-containing compounds, B-containing compounds, Al-containing compounds, Zn-containing compounds, Ti-containing compounds, Sc-containing compounds, Mg-containing compounds, Ca-containing compounds, Sr-containing compounds, and Ba-containing compounds. For example, the composition for glass contains carbonates, nitrates, sulfates, phosphates, basic carbonates and oxides, etc. of the aforesaid elements. In addition, the contents of the aforesaid components are measured in the oxides of the elements, respectively. The specific selections of the carbonates, nitrates, sulfates, phosphates, basic carbonates and oxides of the elements are well known to those skilled in the art, and will not be further detailed here.

When the raw material composition in the present invention is utilized to prepare aluminoborosilicate glass, the obtained glass has the aforesaid excellent overall properties, mainly owing to the cooperation among the components, especially the cooperation among $SiO_2$, $B_2O_3$, $Al_2O_3$, ZnO, $TiO_2$, $Sc_2O_3$, MgO, CaO, SrO, and BaO, particularly the cooperation among the aforesaid components in specific contents.

In the method provided in the present invention, preferably, the conditions for melting treatment include: temperature: lower than 1,550° C.; time: longer than 1 h. Those skilled in the art can determine the specific melting temperature and melting time according to the actual circumstance. The specific melting temperature and melting time are well known to those skilled in the art, and will not be further detailed here.

In the method provided in the present invention, preferably, the conditions for annealing treatment include: temperature: higher than 720° C.; time: longer than 0.1 h. Those skilled in the art can determine the specific annealing temperature and annealing time according to the actual circumstance. The specific annealing temperature and annealing time are well known to those skilled in the art, and will not be further detailed here.

In the method provided in the present invention, there is no particular restriction on the machining. In other words, the machining may be any common machining in the art. For example, the product obtained through the annealing treatment may be cut, ground, and polished, etc.

Preferably, the method further comprises treating the product obtained through the machining process by secondary melting and thinning, further preferably, the conditions of the machining process or the secondary melting and thinning process are controlled to prepare glass in thickness smaller than 0.1 mm.

In the method in the present invention, plate glass in thickness greater than 0.1 mm or flexible glass in thickness smaller than 0.1 mm (i.e., flexible glass in thickness <0.1 mm obtained through an one-step forming process) may be produced with a variety of common glass production methods, such as float method, overflow method, and down-drawing method, etc., or flexible glass in thickness smaller than 0.1 mm may be produced with a secondary melting and thinning method. Therefore, the method may further comprise treating the product obtained through the machining process by secondary melting and thinning to prepare flexible glass in thickness smaller than 0.1 mm. There is no particular restriction on the specific method for secondary melting and thinning. In other words, the method may be any common method in the art. For example, the method for secondary melting and thinning may comprise: producing plate glass in thickness smaller than 1 mm with a glass manufacturing method such as float method, overflow method, or down-drawing method, conveying the plate glass to a feed port of a secondary stretch forming apparatus, feeding the plate glass into a stretch forming furnace at an appropriate feeding rate $V_0$ mm/min., controlling the viscosity in the stretch forming area to be within $10^{5.5}$~$10^7$ P range, performing roll-to-roll winding on the stretching machine and drum at an appropriate stretching rate $V_1$ mm/min., so as to obtain a ultra-thin flexible glass plate material in thickness smaller than 0.1 mm, wherein the stretching rate $V_1$ is greater than $V_0$.

In a third aspect, the present invention provides aluminoborosilicate glass prepared with the method described above.

As described above, glass products different in thickness may be manufactured through different processes. Specifically, plate glass in thickness greater than 0.1 mm or flexible glass in thickness smaller than 0.1 mm may be produced with a variety of common glass production methods, such as float method, overflow method, and down-drawing method, etc., or flexible glass in thickness smaller than 0.1 mm may be produced further with a secondary melting and thinning method. Wherein the bending coefficient $C_R$ of flexible glass in thickness ≤0.5 mm is smaller than 0.5, preferably smaller than 0.45, further preferably smaller than 0.4.

In a fourth aspect, the present invention provides an application of the aluminoborosilicate glass provided in the present invention in preparation of display device and/or solar cell, preferably an application in preparation of a glass substrate material and/or a glass film material for screen surface protection of flat panel display products, a glass substrate material and/or a glass material for surface packaging and/or a glass film material for screen surface protection of flexible display products, or a glass substrate material of flexible solar cell, and application in other application fields where a glass material that has higher thermostability and high flexibility and is easy to bend is required.

Embodiments

Hereunder the present invention will be detailed in embodiments. In the following embodiments, unless otherwise specified, all of the materials are commercially available, and all of the methods are conventional methods in the art.

In the following embodiments and reference examples, the density of glass is measured as per ASTM C-693, in unit of $g/cm^3$.

The thermal expansion coefficient of the glass at 50-350° C. is measured with a horizontal dilatometer as per ASTM E-228, in unit of $10^{-7}$/° C.

The Young's modulus of glass is measured with a mechanical tester for materials as per ASTM C-623, in unit of GPa.

The strain point of the glass with a three-point tester as per ASTM C-336, in unit of ° C.

The transmittance of the glass corresponding to 550 nm wavelength is measured with an UV-2600 UV-visible spectrophotometer.

The liquidus temperature $T_1$ of the glass is measured with a temperature gradient furnace method as per ASTM C-829, in unit of ° C.

A viscosity-temperature curve of glass at high temperatures is measured with a rotary high-temperature viscosimeter as per ASTM C-965; wherein the melting temperature corresponding to 200 P viscosity is denoted as $T_m$, in unit of ° C.; the forming temperature corresponding to 40,000 P viscosity is denoted as $T_4$, in unit of ° C.

The refractivity $n_D$ at 587.6 nm wavelength (sodium yellow laser) is measured at room temperature with a WAY-2S Abbe digital display refractometer.

The minimum curvature radius and bending stress of glass in thickness ≤0.5 mm are measured with a curvature radius and bending stress tester, and the value of the bending coefficient $C_R$ is obtained through calculation.

Embodiments 1-18 and Reference Examples 1-8

The components of glass are weighed as indicated in Tables 1-4 and mixed to a homogeneous state, the mixture is poured into a platinum crucible, then the crucible is heated in a resistance oven at 1,530° C. for 4 h, while the mixture is stirred with a platinum rod to expel the bubbles. The molten glass is poured into a stainless steel/cast iron mold and formed into glass product in a specified shape, then the glass product is annealed in an annealing furnace for 2 h, and then the power is turned off and the glass product is cooled in the furnace to 25° C. The glass product is cut, ground and polished, and then washed with deionized water and dried. Thus, a finished glass product in 0.5 mm thickness meeting the testing requirements is produced. The properties of the glass product are tested respectively. The results are shown in Tables 1-4.

TABLE 1

| wt % | | Example 1 | Example 2 | Example 3 | Example 4 | Example 5 | Example 6 |
|---|---|---|---|---|---|---|---|
| $SiO_2$ | | 45.0 | 50.2 | 52.3 | 33.3 | 36.8 | 40 |
| $Al_2O_3$ | | 8.4 | 6.7 | 6.1 | 9.8 | 8.9 | 7 |
| $B_2O_3$ | | 21.3 | 17.3 | 13.3 | 29.9 | 28.1 | 23 |
| MgO | | 4.6 | 5.3 | 0 | 7.3 | 6.2 | 5 |
| CaO (introduced not as clarifier) | | 2.6 | 3.8 | 4.7 | 2 | 5.3 | 5 |
| SrO (introduced not as clarifier) | | 0 | 0.9 | 3.8 | 3 | 0 | 1.4 |
| BaO (introduced not as clarifier) | | 10 | 6.7 | 13.1 | 5 | 3 | 14.7 |
| ZnO | | 6.8 | 6.2 | 6 | 8.5 | 7.3 | 2.65 |
| $TiO_2$ | | 0.2 | 2.2 | 0 | 0 | 3.0 | 0.5 |
| $Sc_2O_3$ | | 0.5 | 0.4 | 0.2 | 1 | 0.7 | 0.05 |
| $La_2O_3$ | | 0 | 0 | 0 | 0 | 0 | 0 |
| $Nb_2O_5$ | | 0 | 0 | 0 | 0 | 0 | 0 |
| $ZrO_2$ | | 0 | 0 | 0 | 0 | 0 | 0 |
| Clarifier | Calcium oxide introduced as calcium fluoride | 0.3 | 0 | 0 | 0 | 0.4 | 0 |
| | Strontium oxide introduced as strontium chloride | 0 | 0 | 0 | 0 | 0 | 0.2 |
| | Barium oxide introduced as barium sulfate | 0.3 | 0 | 0.2 | 0 | 0.3 | 0.5 |
| | $SnO_2$ | 0 | 0.3 | 0 | 0 | 0 | 0 |
| | SnO | 0 | 0 | 0.3 | 0.2 | 0 | 0 |
| $SiO_2 + Al_2O_3$ | | 53.4 | 56.9 | 58.4 | 43.1 | 45.7 | 47.0 |
| $ZnO/(ZnO + TiO_2 + Sc_2O_3)$ | | 0.91 | 0.70 | 0.97 | 0.89 | 0.66 | 0.83 |
| (MgO + BaO)/RO | | 0.84 | 0.72 | 0.61 | 0.71 | 0.63 | 0.75 |
| RO | | 17.8 | 16.7 | 21.8 | 17.3 | 15.2 | 26.8 |
| $ZnO + TiO_2 + Sc_2O_3$ | | 7.5 | 8.8 | 6.2 | 9.5 | 11.0 | 3.2 |
| D | | 0.51 | 0.44 | 0.36 | 0.65 | 0.55 | 0.54 |
| Density | $g/cm^3$ | 2.55 | 2.53 | 2.61 | 2.50 | 2.43 | 2.60 |
| Coefficient of expansion (50-350□) | $*10^{-7}$/□ | 29.7 | 29.4 | 38.6 | 33.4 | 29.4 | 30.7 |
| Young's modulus | Gpa | 68.6 | 69.4 | 65.4 | 69.9 | 71.5 | 70.2 |
| refractivity $n_D$ | | 1.528 | 1.545 | 1.536 | 1.543 | 1.538 | 1.523 |
| Melting temperature $T_m$ | □ | 1474 | 1534 | 1511 | 1471 | 1516 | 1528 |
| Molding temperature $T_4$ | □ | 1238 | 1267 | 1301 | 1253 | 1235 | 1222 |
| Liquidus temperature $T_1$ | □ | 1080 | 1080 | 1100 | 1100 | 1070 | 1070 |
| $T_4 - T_1$ | □ | 158 | 187 | 201 | 153 | 165 | 152 |
| Strain point | □ | 682 | 715 | 721 | 698 | 685 | 686 |
| Transmittance | % | 91.4 | 92.1 | 91.1 | 91.3 | 91.7 | 91.4 |

It should be noted that there are five types of clarifiers enumerated in the embodiments and reference examples in the Tables 1-4: $CaF_2$, $SrCl_2$, $BaSO_4$, $SnO_2$, and SnO. After the first three raw materials are fed into the furnace, a major fraction of the anions form gasses and escape from the glass liquid, while the remaining minor fraction of the anions are dissolved into the glass network structure. Owing to a fact that $F^-$, $Cl^-$, and $SO_4^{2-}$ can't form uniform grids with $O^{2-}$, they reside in the gaps in the network, just like Ca, Sr, and Ba cations do. Finally, covalent balance happens between Ca, Sr, and Ba cations and more oxygen ions. Therefore, when the three types of clarifiers $CaF_2$, $SrCl_2$ and $BaSO_4$ are involved in the calculation of the D value in the examples and comparative examples in the present invention, they shall be still calculated according to the corresponding CaO, SrO and BaO, and shall not be included in ΣQ; in contrast, $SnO_2$ and SnO shall be included in ΣQ.

TABLE 2

| wt % | | Example 7 | Example 8 | Example 9 | Example 10 | Example 11 | Example 12 |
|---|---|---|---|---|---|---|---|
| $SiO_2$ | | 43.6 | 47 | 55 | 57 | 58 | 60 |
| $Al_2O_3$ | | 8.2 | 5 | 7.5 | 3 | 3 | 4 |
| $B_2O_3$ | | 25.7 | 19 | 18 | 15 | 11 | 14 |
| MgO | | 0.5 | 4 | 3 | 1 | 9 | 1 |
| CaO (introduced not as clarifier) | | 2 | 2 | 3 | 3.5 | 1.8 | 0.6 |
| SrO (introduced not as clarifier) | | 0 | 1.0 | 1 | 0 | 0 | 0 |
| BaO (introduced not as clarifier) | | 4.6 | 17 | 11 | 17.7 | 13.4 | 7 |
| ZnO | | 11.2 | 3.2 | 0.89 | 1.97 | 1.9 | 7.999 |
| $TiO_2$ | | 3 | 1.3 | 0.4 | 0 | 0.9 | 5 |
| $Sc_2O_3$ | | 0.8 | 0.3 | 0.01 | 0.03 | 0.1 | 0.001 |
| $La_2O_3$ | | 0 | 0 | 0 | 0 | 0 | 0 |
| $Nb_2O_5$ | | 0 | 0 | 0 | 0 | 0 | 0 |
| $ZrO_2$ | | 0 | 0 | 0 | 0 | 0 | 0 |
| Clarifier | Calcium oxide introduced as calcium fluoride | 0 | 0 | 0 | 0.5 | 0.4 | 0 |
| | Strontium oxide introduced as strontium chloride | 0 | 0 | 0 | 0 | 0.2 | 0 |
| | Barium oxide introduced as barium sulfate | 0.4 | 0.2 | 0.2 | 0.3 | 0.3 | 0 |
| | $SnO_2$ | 0 | 0 | 0 | 0 | 0 | 0 |
| | SnO | 0 | 0 | 0 | 0 | 0 | 0.4 |
| $SiO_2 + Al_2O_3$ | | 51.8 | 52.0 | 62.5 | 60.0 | 61.0 | 64.0 |
| $ZnO/(ZnO + TiO_2 + Sc_2O_3)$ | | 0.75 | 0.67 | 0.68 | 0.99 | 0.66 | 0.62 |
| (MgO + BaO)/RO | | 0.73 | 0.88 | 0.78 | 0.83 | 0.90 | 0.93 |
| RO | | 7.5 | 24.2 | 18.2 | 23.0 | 25.1 | 8.6 |
| $ZnO + TiO_2 + Sc_2O_3$ | | 15.0 | 4.8 | 1.3 | 2.0 | 2.9 | 13.0 |
| D | | 0.60 | 0.60 | 0.04 | 0.09 | 0.08 | 0.08 |
| Density | $g/cm^3$ | 2.47 | 2.62 | 2.49 | 2.63 | 2.61 | 2.52 |
| Coefficient of xpansion (50-350□) | $*10^{-7}$/□ | 31.1 | 32.0 | 32.9 | 36.8 | 39.1 | 33.2 |
| Young's modulus | Gpa | 60.5 | 68.2 | 68.1 | 65.1 | 78.2 | 67.1 |
| refractivity $n_D$ | | 1.532 | 1.527 | 1.522 | 1.523 | 1.524 | 1.548 |
| Melting temperature $T_m$ | □ | 1529 | 1460 | 1509 | 1534 | 1526 | 1495 |
| Molding temperature $T_4$ | □ | 1230 | 1215 | 1252 | 1250 | 1241 | 1280 |
| Liquidus temperature $T_1$ | □ | 1090 | 1070 | 1200 | 1180 | 1180 | 1210 |
| $T_4 - T_1$ | □ | 140 | 145 | 52 | 70 | 61 | 70 |
| Strain point | □ | 688 | 682 | 684 | 698 | 686 | 694 |
| Transmittance | % | 92.4 | 91.0 | 91.6 | 91.1 | 91.7 | 91.7 |

TABLE 3

| wt % | | Example 13 | Example 14 | Example 15 | Example 16 | Example 17 | Example 18 |
|---|---|---|---|---|---|---|---|
| $SiO_2$ | | 50.2 | 50.2 | 59.7 | 50.2 | 40 | 33 |
| $Al_2O_3$ | | 6.7 | 6.7 | 10 | 9.7 | 3 | 3.5 |
| $B_2O_3$ | | 17.3 | 17.3 | 10 | 10.1 | 28 | 30 |
| MgO | | 3.8 | 5.3 | 0 | 7 | 4 | 6 |
| CaO (introduced not as clarifier) | | 5.3 | 3.8 | 3.6 | 6.3 | 2 | 0 |
| SrO (introduced not as clarifier) | | 6.7 | 0.9 | 0.9 | 0.9 | 1 | 3 |
| BaO (introduced not as clarifier) | | 0.9 | 6.7 | 6.7 | 6.7 | 17 | 14.5 |
| ZnO | | 6.2 | 2.2 | 6.2 | 6.2 | 3.2 | 6.2 |
| $TiO_2$ | | 2.2 | 6.2 | 2.2 | 2.2 | 1.4 | 3.4 |
| $Sc_2O_3$ | | 0.4 | 0.4 | 0.4 | 0.4 | 0.3 | 0.3 |
| $La_2O_3$ | | 0 | 0 | 0 | 0 | 0 | 0 |
| $Nb_2O_5$ | | 0 | 0 | 0 | 0 | 0 | 0 |
| $ZrO_2$ | | 0 | 0 | 0 | 0 | 0 | 0 |
| Clarifier | Calcium oxide introduced as calcium fluoride | 0 | 0 | 0 | 0 | 0 | 0 |
| | Strontium oxide introduced as strontium chloride | 0 | 0 | 0 | 0 | 0 | 0 |
| | Barium oxide introduced as barium sulfate | 0 | 0 | 0 | 0 | 0 | 0 |
| | SnO2 | 0.3 | 0.3 | 0.3 | 0.3 | 0.1 | 0.1 |
| | SnO | 0 | 0 | 0 | 0 | 0 | 0 |
| $SiO_2 + Al_2O_3$ | | 56.9 | 56.9 | 69.7 | 59.9 | 43 | 36.5 |
| $ZnO/(ZnO + TiO_2 + Sc_2O_3)$ | | 0.70 | 0.25 | 0.70 | 0.70 | 0.65 | 0.63 |
| (MgO + BaO)/RO | | 0.28 | 0.72 | 0.60 | 0.66 | 0.88 | 0.87 |
| RO | | 16.7 | 16.7 | 11.2 | 20.9 | 24 | 23.5 |
| $ZnO + TiO_2 + Sc_2O_3$ | | 8.8 | 8.8 | 8.8 | 8.8 | 4.9 | 9.9 |

TABLE 3-continued

| wt % | | Example 13 | Example 14 | Example 15 | Example 16 | Example 17 | Example 18 |
|---|---|---|---|---|---|---|---|
| D | | 0.36 | 0.44 | −0.22 | 0.20 | 0.80 | 0.91 |
| Density | g/cm$^3$ | 2.52 | 2.45 | 2.68 | 2.65 | 2.56 | 2.65 |
| Coefficient of expansion (50-350□) | *$10^{-7}$/□ | 30.3 | 33.6 | 41.7 | 33.8 | 30.2 | 29.5 |
| Young's modulus | Gpa | 71.2 | 80.7 | 80.7 | 81.6 | 64.7 | 70.9 |
| refractivity nD | | 1.524 | 1.542 | 1.521 | 1.552 | 1.509 | 1.531 |
| Melting temperature $T_m$ | □ | 1591 | 1517 | 1619 | 1546 | 1415 | 1377 |
| Molding temperature $T_4$ | □ | 1272 | 1270 | 1335 | 1246 | 1180 | 1020 |
| Liquidus temperature $T_1$ | □ | 1230 | 1270 | 1350 | 1140 | 1080 | 1130 |
| $T_4 - T_1$ | □ | 42 | 0 | −15 | 106 | 100 | −110 |
| Strain point | □ | 677 | 743 | 787 | 696 | 609 | 543 |
| Transmittance | % | 91.5 | 92.0 | 91.5 | 91.8 | 91.5 | 91.9 |

TABLE 4

| wt % | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| $SiO_2$ | | 28 | 72 | 49 | 57 | 57 | 45 | 34.9 | 37.5 |
| $Al_2O_3$ | | 17 | 7 | 18 | 3 | 3 | 5 | 1.6 | 8.9 |
| $B_2O_3$ | | 35 | 5.8 | 4 | 12 | 12 | 0 | 0 | 28.1 |
| MgO | | 5 | 2 | 0.8 | 5 | 5 | 4.2 | 0 | 6.2 |
| CaO (introduced not as clarifier) | | 3 | 8 | 13 | 5 | 5 | 5.9 | 5.8 | 5.3 |
| SrO (introduced not as clarifier) | | 4 | 1 | 4 | 0 | 0 | 10.9 | 4.8 | 0 |
| BaO (introduced not as clarifier) | | 7.8 | 4 | 4 | 8.7 | 8.7 | 16 | 26.9 | 3 |
| ZnO | | 0 | 0 | 6 | 1 | 1 | 0 | 0 | 7.3 |
| $TiO_2$ | | 0 | 0 | 1 | 8 | 0 | 7 | 9.6 | 3 |
| $Sc_2O_3$ | | 0 | 0 | 0 | 0 | 8 | 0 | 0 | 0 |
| $La_2O_3$ | | 0 | 0 | 0 | 0 | 0 | 2.9 | 3.8 | 0 |
| $Nb_2O_5$ | | 0 | 0 | 0 | 0 | 0 | 0 | 9.2 | 0 |
| ZrO2 | | 0 | 0 | 0 | 0 | 0 | 2.9 | 3.2 | 0 |
| Clarifier | Calcium oxide introduced as calcium fluoride | 0 | 0 | 0 | 0 | 0 | 0 | 0 | 0.4 |
| | Strontium oxide introduced as strontium chloride | 0 | 0 | 0 | 0 | 0 | 0 | 0 | 0 |
| | Barium oxide introduced as barium sulfate | 0.2 | 0 | 0 | 0.3 | 0.3 | 0 | 0 | 0.3 |
| | $SnO_2$ | 0 | 0 | 0 | 0 | 0 | 0.2 | 0.2 | 0 |
| | SnO | 0 | 0.2 | 0.2 | 0 | 0 | 0 | 0 | 0 |
| $SiO_2 + Al_2O_3$ | | 45.0 | 79.0 | 67.0 | 60.0 | 60.0 | 50.0 | 36.5 | 46.4 |
| $ZnO/(ZnO + TiO_2 + Sc_2O_3)$ | | 0.00 | 0.00 | 0.86 | 0.11 | 0.11 | 0.00 | 0.00 | 0.71 |
| $(MgO + BaO)/RO$ | | 0.65 | 0.40 | 0.22 | 0.73 | 0.73 | 0.55 | 0.72 | 0.63 |
| RO | | 20.0 | 15.0 | 21.8 | 19.0 | 19.0 | 37.0 | 37.5 | 15.2 |
| $ZnO + TiO_2 + Sc_2O_3$ | | 0.0 | 0.0 | 7.0 | 9.0 | 9.0 | 7.0 | 9.6 | 10.3 |
| D | | 0.51 | −0.49 | −0.31 | 0.03 | 0.03 | −0.04 | −0.35 | 0.54 |
| Density | g/cm$^3$ | 2.39 | 2.44 | 2.70 | 2.50 | 2.51 | 3.34 | 3.73 | 2.42 |
| Coefficient of expansion (50-350□) | *$10^{-7}$/□ | 31.1 | 34.7 | 33.6 | 40.4 | 41.9 | 74.2 | 79.1 | 29.2 |
| Young's modulus | Gpa | 71.2 | 75.8 | 68.2 | 77.1 | 80.2 | 76.4 | 71.1 | 70.8 |
| refractivity $n_D$ | | 1.519 | 1.504 | 1.551 | 1.538 | 1.529 | 1.652 | 1.581 | 1.517 |
| Melting temperature $T_m$ | □ | 1375 | 1738 | 1572 | 1507 | 1493 | 1467 | 1411 | 1549 |
| Molding temperature $T_4$ | □ | 1149 | 1231 | 1219 | 1227 | 1196 | 1067 | 1032 | 1247 |
| Liquidus temperature $T_1$ | □ | 1010 | 1190 | 1170 | 1220 | 1280 | 1110 | 1031 | 1160 |
| $T_4 - T_1$ | □ | 139 | 41 | 49 | 7 | −84 | −43 | 1 | 87 |
| Strain point | □ | 558 | 609 | 675 | 607 | 596 | 692 | 700 | 6667 |
| Transmittance | % | 90.7 | 91.5 | 91.9 | 92 | 91.4 | 90.9 | 91.8 | 91.2 |

It is seen from the comparison of the data in Tables 1-4: the glass prepared according to the present invention apparently has low density, high index of refraction, high stability of glass formation, low thermal expansion coefficient, high thermostability, high flexibility, and is easy to bend.

Glass is prepared with the method in some of the examples and comparative examples, and then secondary melting and thinning treatment is carried out, wherein the method for secondary melting and thinning comprises: conveying the plate glass in 0.5 mm thickness and 50 mm width obtained through cutting, grinding and polishing to the feed port of a secondary stretch forming machine, feeding the plate glass into the stretch forming furnace at a rate of $V_0$ mm/min., controlling the viscosity P in the stretch forming area, and carrying out roll-to-roll winding with the stretching machine and drum at a rate of $V_1$ mm/min., so as to obtain flexible glass in thickness d1 and width d2. The minimum curvature radius of the finished glass product is measured with a curvature radius and bending stress tester. The conditions and corresponding bending coefficients in some of the examples are shown in Table 5.

TABLE 5

| | Rate $V_0$ (mm/min) | Viscosity P(P) | Rate $V_1$(mm/min) | Thickness d1 (mm) | Width d2 (mm) | Curvature radius (mm) | Bending stress (MPa) | Young's modulus (GPa) | Bending coefficient $C_R$ |
|---|---|---|---|---|---|---|---|---|---|
| Example 1 | — | — | — | 0.5 | 50 | 1000 | 15 | 68.6 | 0.44 |
| Example 1 | 5 | $10^{5.6}$ | 87 | 0.09 | 16 | 35 | 72 | 68.6 | 0.41 |
| Example 2 | 5 | $10^{6.1}$ | 167 | 0.075 | 10 | 16 | 41 | 69.4 | 0.13 |
| Example 6 | 5 | $10^{5.8}$ | 100 | 0.05 | 25 | 26 | 45 | 70.2 | 0.33 |
| Example 7 | 5 | $10^{5.9}$ | 137 | 0.07 | 13 | 20 | 53 | 60.5 | 0.25 |
| Example 9 | 5 | $10^{5.8}$ | 195 | 0.08 | 8 | 38 | 55 | 68.1 | 0.38 |
| Comparative Example 2 | 5 | $10^{6.0}$ | 223 | 0.08 | 7 | 56 | 89 | 75.8 | 0.82 |
| Comparative Example 3 | 5 | $10^{5.7}$ | 250 | 0.05 | 10 | 45 | 90 | 68.2 | 1.19 |
| Comparative Example 8 | 5 | $10^{5.9}$ | 137 | 0.07 | 13 | 95 | 104 | 70.8 | 1.99 |

It is seen from the result in the Table 5: the method provided in the present invention can be used to prepare aluminoborosilicate glass in thickness ≤0.5 mm with bending coefficient $C_R$ smaller than 0.5. During the bending, the smaller the $C_R$ value is, the lower bending stress of the glass plate is in the same bending radius, indicating that the bending radius of the glass plate can be reduced further, i.e., the glass plate has better flexibility and bendability.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. Aluminoborosilicate glass, based on the total weight of components in the composition of the glass, comprising: 33-60 wt % $SiO_2$, 3-10 wt % $Al_2O_3$, 10-30 wt % $B_2O_3$, 1-15 wt % $ZnO+TiO_2+Sc_2O_3$, and 7-27 wt % alkaline-earth oxide RO, wherein RO is at least one of MgO, CaO, SrO and BaO, and 0.001 wt %≤$Sc_2O_3$≤1 wt %.

2. The aluminoborosilicate glass of claim 1, wherein based on the total weight of components in the composition of the glass, the contents of the components of the glass measured in weight percentage meet: (MgO+BaO)/(MgO+CaO+SrO+BaO)>0.6.

3. The aluminoborosilicate glass of claim 1, wherein based on the total weight of components in the composition of the glass, the contents of the components of the glass measured in weight percentage meet: $ZnO/(ZnO+TiO_2+Sc_2O_3)>0.6$.

4. The aluminoborosilicate glass of claim 1, wherein based on the total weight of components in the composition of the glass, the contents of the components of the glass measured in weight percentage meet: 0.1 wt %≤$Sc_2O_3$≤0.7 wt %.

5. The aluminoborosilicate glass of claim 1, wherein based on the total weight of components in the composition of the glass, the contents of the components of the glass measured in weight percentage meet: 40 wt %≤$SiO_2$+$Al_2O_3$≤65 wt %.

6. The aluminoborosilicate glass of claim 1, wherein based on the total weight of components in the composition of the glass, the contents of the components of the glass measured in weight percentage meet: the brittleness coefficient D is 0-1, wherein the value D is calculated with the following formula:

$$D=P_1*SiO_2+2.0*B_2O_3-2.0*(Al_2O_3+CaO)+0.5*SrO+1.0*(MgO+BaO+ZnO+TiO_2+Sc_2O_3)-4*\Sigma Q$$

wherein $SiO_2$, $B_2O_3$, $Al_2O_3$, MgO, CaO, SrO, BaO, ZnO, $TiO_2$, and $Sc_2O_3$ respectively represent the weight percentages of the components in the total weight, ΣQ represents the sum of other components except $SiO_2$, $B_2O_3$, $Al_2O_3$, MgO, CaO, SrO, BaO, ZnO, $TiO_2$, and $Sc_2O_3$, and $P_1$ is 0.2 if 33 wt %≤$SiO_2$≤54 wt %, or is −0.5 if 54 wt %<$SiO_2$≤60 wt %.

7. The aluminoborosilicate glass of claim 1, wherein the density of the aluminoborosilicate glass is lower than 3 g/cm3; the refractive index nD is greater than 1.52; the thermal expansion coefficient within 50-350° C. range is lower than 45×10−7/° C.

8. The aluminoborosilicate glass of claim 1, wherein the bending coefficient CR of aluminoborosilicate glass in thickness ≤0.5 mm meets: 0<CR<0.5 , wherein the CR value is calculated with the following formula:

$$CR=(R*\sigma)/(E*d)$$

wherein E is the Young's modulus of the aluminoborosilicate glass, in unit of MPa; d is the thickness of the aluminoborosilicate glass, in unit of mm; R is the minimum curvature radius of the aluminoborosilicate glass when the aluminoborosilicate glass is bent, in unit of mm; σ is the bending stress in the aluminoborosilicate glass the curvature radius R, in unit of MPa.

9. The aluminoborosilicate glass of claim 1, wherein the strain point temperature of the aluminoborosilicate glass is higher than 680° C., and/or the difference between the forming temperature T4 and the liquidus temperature Tl of the aluminoborosilicate glass is greater than 100° C., and/or the Young's modulus of the aluminoborosilicate glass is smaller than 80 GPa.

10. A method for preparing aluminoborosilicate glass, comprising: providing a raw material composition according to the composition of the aluminoborosilicate glass of claim 1, and treating the raw material composition by melting, forming, annealing, and machining sequentially.

11. A method for preparing a display device and/or solar cell comprising providing the aluminoborosilicate glass of claim 1.

12. The aluminoborosilicate glass of claim 6, the contents of the components of the glass measured in weight percentage meet: the brittleness coefficient D is 0.2-0.8.

13. The aluminoborosilicate glass of claim 6, the contents of the components of the glass measured in weight percentage meet: the brittleness coefficient D is 0.3-0.6.

14. The aluminoborosilicate glass of claim 7, wherein the density of the aluminoborosilicate glass is 2.43-2.68 g/cm$^3$; the refractive index $n_D$ is $1.52<n_D<1.55$; the thermal expansion coefficient within 50-350° C. range is $29\times10^{-7}$/° C.–$41\times10^{-7}$/° C.

15. The aluminoborosilicate glass of claim 8, wherein the bending coefficient $C_R$ of aluminoborosilicate glass in thickness ≤0.5 mm meets: $0<C_R<0.45$.

16. The aluminoborosilicate glass of claim 8, wherein the bending coefficient $C_R$ of aluminoborosilicate glass in thickness ≤0.5 mm meets: $0<C_R<0.4$.

17. The method of claim 10, wherein the method further comprises treating the product obtained through the machining process by secondary melting and thinning.

18. The method of claim 10, wherein the conditions of the machining process or the secondary melting and thinning process are controlled to prepare glass in thickness smaller than 0.1 mm.

19. The method of claim 11, further comprising applying the aluminoborosilicate glass (1) as a glass substrate material and/or a glass film material to a screen surface of a flat panel display product as a screen protection, (2) as a surface packaging and/or a glass film material of a flexible display product for screen surface protection thereof, or (3) as a glass substrate material of flexible solar cell.

* * * * *